United States Patent [19]

Riddle

[11] Patent Number: 4,466,060
[45] Date of Patent: Aug. 14, 1984

[54] MESSAGE ROUTING IN A COMPUTER NETWORK

[75] Inventor: Guy G. Riddle, Piscataway, N.J.

[73] Assignee: AT&T Bell Telephone Laboratories, Incorporated, Murray Hill, N.J.

[21] Appl. No.: 348,158

[22] Filed: Feb. 11, 1982

[51] Int. Cl.[3] .............................................. G06F 15/16
[52] U.S. Cl. .................................................. 364/200
[58] Field of Search ........................ 364/200 MS File

[56] References Cited

U.S. PATENT DOCUMENTS

| | | | |
|---|---|---|---|
| 4,247,892 | 1/1981 | Lawrence | 364/200 |
| 4,251,861 | 2/1981 | Mago | 364/200 |
| 4,412,285 | 10/1983 | Neches et al. | 364/200 |

OTHER PUBLICATIONS

Tajibnapis, W. D., "A Correctness Proof of a Topology Information Maintenance Protocol for a Distributed Computer Network", *Communications of the ACM*, Jul. 1977, pp. 477-485.
McQuillan, J. M., et al., "An Overview of the New Routing Algorithm for the ARPANET", *Proceedings of the Sixth IEEE Data Communications Symposium*, Nov. 1979, pp. 63-68.
Rosen, E. C., "The Updating Protocol of ARPANET'S New Routing Algorithm", *Computer Networks*, 4, 1980, pp. 11-19.

*Primary Examiner*—Raulfe B. Zache
*Attorney, Agent, or Firm*—S. J. Phillips

[57] ABSTRACT

An adaptive distributed message routing algorithm that may be implemented in a computer program to control the routing of data messages in a packet message switching digital computer network. Network topology information is exchanged only between neighbor nodes in the form of minimum spanning trees, referred to as exclusionary trees. An exclusionary tree is formed by excluding the neighbor node and its links from the tree. From the set of exclusionary trees received a route table and transmitted exclusionary trees are constructed.

22 Claims, 19 Drawing Figures

COMPUTER NETWORK

COMPUTER NETWORK

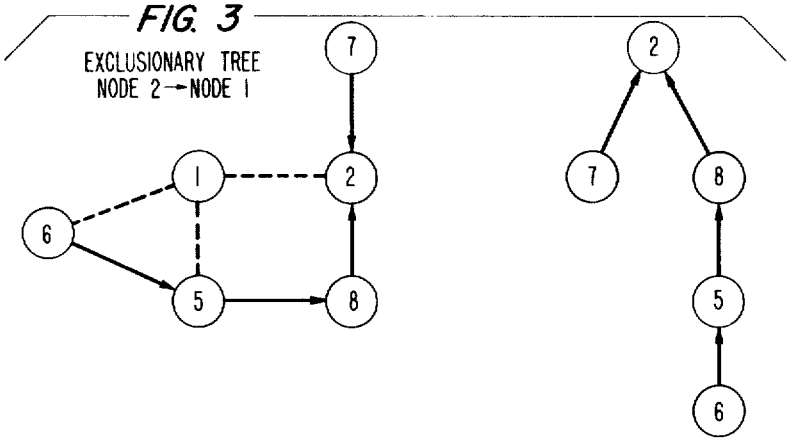
FIG. 3 EXCLUSIONARY TREE NODE 2→NODE 1
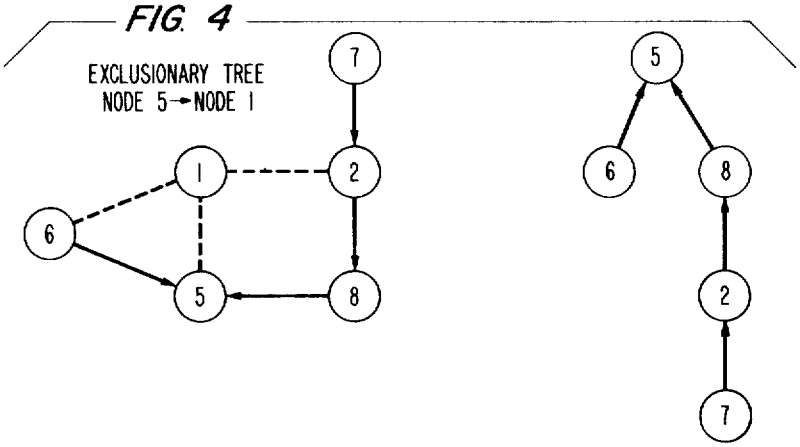
FIG. 4 EXCLUSIONARY TREE NODE 5→NODE 1
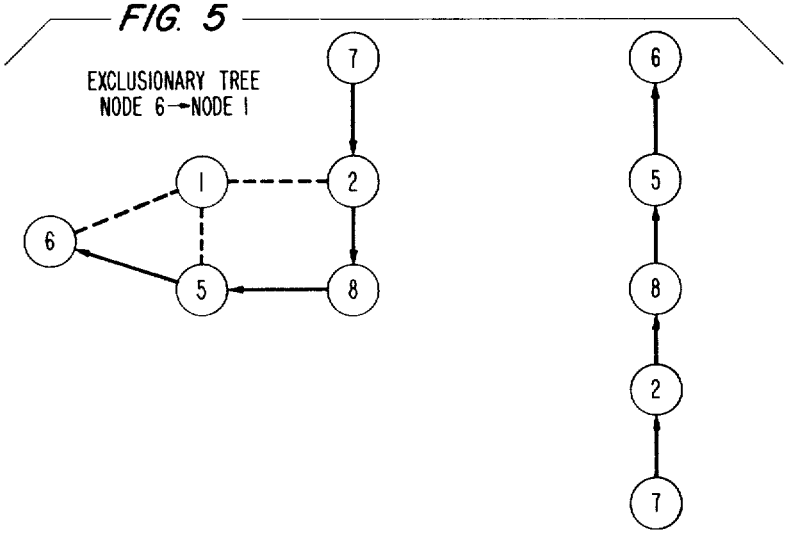
FIG. 5 EXCLUSIONARY TREE NODE 6→NODE 1

CONTROL MESSAGE
EXCHANGE NODE 1

HELLO MESSAGE
FORMAT

NODE 1 → NODE 6
NODE 1 → NODE 5
NODE 1 → NODE 2

| HEADER | | | | DATA |
|---|---|---|---|---|
| S | D | T | | V |
| 1 | 0 | H | | 13 |

ROUTING MESSAGE
FORMAT

| | HEADER | | | DATA | | | | | | | | | | |
|---|---|---|---|---|---|---|---|---|---|---|---|---|---|---|
| | S | D | T | 0 | 1 | 2 | 3 | 4 | 5 | 6 | 7 | 8 | 9 | |
| NODE 2 → NODE 1 | 2 | 0 | R | - | - | 0 | - | - | 8 | 5 | 2 | 2 | - | |
| NODE 5 → NODE 1 | 5 | 0 | R | - | - | 8 | - | - | 0 | 5 | 2 | 5 | - | |
| NODE 6 → NODE 1 | 6 | 0 | R | - | - | 8 | - | - | 6 | 0 | 2 | 5 | - | |

ROUTING GRAPH CONSTRUCTION

ROUTE TABLE CONSTRUCTION

| DESTINATION NODE | ROUTE NODE |
|---|---|
| 1 | - |
| 2 | 2 |
| 3 | NONE |
| 4 | NONE |
| 5 | 5 |
| 6 | 6 |
| 7 | 2 |
| 8 | 2,5 |

ROUTING MESSAGE FORMAT

| | | HEADER | | | | | | | DATA | | | | | | |
|---|---|---|---|---|---|---|---|---|---|---|---|---|---|---|---|
| | S | D | T | 0 | 1 | 2 | 3 | 4 | 5 | 6 | 7 | 8 | 9 | |
| NODE 1→NODE 5 | 1 | 0 | R | - | 0 | 1 | - | - | - | 1 | 2 | 2 | - | |
| NODE 1→NODE 2 | 1 | 0 | R | - | 0 | - | - | - | 1 | 1 | - | 5 | - | |
| NODE 1→NODE 6 | 1 | 0 | R | - | 0 | 1 | - | - | 1 | - | 2 | 2 | - | |

MULTIPLE LINKS

ROUTE TABLE CONSTRUCTION - MULTIPLE LINKS

| DESTINATION NODE | ROUTE LINK |
|---|---|
| 1 | - |
| 2 | C,D,F |
| 3 | NONE |
| 4 | NONE |
| 5 | A |
| 6 | B,E |
| 7 | C,D,F |
| 8 | A,C,D,F |

LINK WEIGHTS

ROUTING GRAPH CONSTRUCTION—WEIGHTED HOP COUNTS

ROUTE TABLE CONSTRUCTION-
WEIGHTED HOP COUNTS

| DESTINATION NODE | ROUTE NODE |
|---|---|
| 1 | - |
| 2 | 2 |
| 3 | NONE |
| 4 | NONE |
| 5 | 5 |
| 6 | 5 |
| 7 | 2 |
| 8 | 2 |

WEIGHTED ROUTING MESSAGE FORMAT

MESSAGE ROUTING IN A COMPUTER NETWORK

BACKGROUND OF THE INVENTION

1. Technical Field

This invention relates to distributed computing systems, and more particularly to the art of routing messages between computers in a distributed computing system.

2. Description of the Prior Art

A distributed computing system is an arrangement of computers dispersed over a wide geographical area. Individual host computer systems provide data processing services, and are connected together through a network of communication processors and communication lines. The communication processor is typically a minicomputer or special purpose hardware for message switching controlled by a minicomputer. Such processors form the nodes of the network, and the communication lines are the links that interconnect the nodes. A link is a bi-directional communication path that terminates at a single node on either end. Two nodes having a link between them are said to be neighbors. It is impractical to provide direct communication facilities for every pair of nodes on a typical network so that a message conveyed over the network may pass over one or more intermediate links before reaching its destination.

The function of the host computer is to provide data processing service interactively for users who log on remotely using the network to communicate the necessary exchange of messages that makes up an interactive session. The function of the node, including its control computer, is to provide network services. This includes receiving messages from and transmitting messages to distant users who have logged on over the network to a host served by the node, relaying received messages ultimately destined for some distant node, and managing the communication links between the node and each of its neighbors. In some cases, the network function may be performed by a telecommunications software package installed in the host computer in addition to the data processing software. But more typically the network function is off-loaded into separate node hardware. In any event, a user may log on to a distant computer on the network and interact without concern for the network communication activities taking place.

Each message on the network typically is routed independently, with the nodes adapting to changes in network topology. Thus, if a link goes out of service, messages will be routed over available working links, and any user session with a different computer will continue uninterrupted so long as there is some combination of links over which messages can be routed between user and computer.

The routing of messages is an important network management function that typically takes place at control level 3 under the CCITT packet switching protocol nomenclature. In some prior art arrangements this function is performed by a centralized network management computer (manager). Under this arrangement each node notifies the manager as links connected to the node go down (out of service) or come up (in service). The manager can, therefore, maintain an overview of the entire network's operations and can determine the routing that messages should take to minimize the number of links used. The disadvantage of this arrangement is the high degree of dependency on the manager. Thus if the manager is down network operations may be difficult or impossible. For this reason, managers are made highly reliable, by redundant back-up equipment for example, which adds to the expense and complexity of the network.

A more desirable arrangement is to avoid the use of a centralized network manager and to locate the network routing function in each of the network nodes. One possible implementation of this idea is to have the full network routing function in each node. Thus each node receives full network information from every other node. This is not a completely satisfactory solution since the sending and receiving of messages containing routing information to distant nodes meets the same routing difficulties as the sending and receiving of messages containing normal data. In the prior art, this difficulty has been met by providing two different message routing and handling procedures; one for the normal data messages, and another for the routing messages. This leads to considerable complexity in network design. See, for example, "An Overview of the New Routing Algorithm for the ARPANET," J. M. McQuillan, I. Richer, and E. C. Rosen, *Proceedings of the Sixth IEEE Data Communications Symposium*, November, 1979, which describes the handling of data messages, and "The Updating Protocol of ARPANET's New Routing Algorithm" by E. C. Rosen, pp. 11-19, *Computer Networks* 4, North Holland Publishing, 1980, which describes the handling of routing messages on the same network.

A better solution is for each node to be concerned only with the routing of messages between itself and its neighbors. Thus, it is not necessary that a node maintain complete information about the operation of the entire network. It is sufficient for the node to maintain only that information necessary to enable the node to move the message toward its ultimate destination. A suitable decision criterion is used, such as traversing the minimum total number of links. Under this arrangement the distinction between data messages and routing messages is reduced, simplifying the network design. Also, there is no centralized responsibility for determining the correct routing of messages. There is, instead, distributed responsibility. Each node assumes responsibility for forwarding messages to the next appropriate node without full knowledge of the present status of the entire network. The total effect achieved is proper message routing in a simplified fashion without reliance on a centralized authority. If a node goes down, other effected nodes will adapt to the changed conditions and the network functions continue.

The preferred routing procedure, or algorithm, is a distributed one. The term algorithm is not here used in its mathematical sense, that is, the application of mathematical steps to result in a numerical result, but is used in its procedural sense, that is, the procedural or method steps to be used to result in the ultimate goal of physically routing message traffic on a computer network.

The preferred routing algorithm is also adaptive. That is, as network conditions change—links go down or come up, nodes go down or come up—the routing is changed as needed to adapt to the new conditions.

An example of a prior art adaptive distributed routing algorithm is given in the article "A Correctness Proof of a Topology Information Maintenance Protocol for a Distributed Computer Network" by W. D. Tajibnapis, *Communications of the ACM*, July, 1977. Tejibnapis shows a method that selects routing depending on minimum distance, where distance is measured by the number of links traversed or "hops" to the ultimate destination. Each node maintains a distance table containing the hop count, showing the number of links that must be traversed to reach any other node in the network, beginning with each neighbor of the node containing the table. From this distance table, a route table is constructed showing, for each destination node in the network, the outgoing link that will result in the minimum total hop count for that destination node. In the event of a network change, each effected node modifies its internal route table and communicates information from this new table to each of its neighbors.

This prior art technique leads to certain problems. When the neighbor node modifies its distance table in accordance with the new information, situations may occur temporarily where a node appears to be unreachable (isolated) when in fact it can be reached. Further, this information can result in the appearance of a "phantom" node. A node that is, in fact, isolated may appear to be reachable long after its communication links have gone down. Data messages intended for the isolated node are routed from node to node in a futile effort to reach the isolated node and may temporarily interfere with network operation. Additional steps in the prior art procedure are needed to identify and eliminate such phantom nodes. These additional steps require the exchange of a number of additional routing messages, further occupying network resources.

SUMMARY OF THE INVENTION

The present invention is a method that may be implemented in a computer program or in hardware that performs an improved adaptive distributed message routing algorithm for a distributed computer network. Routing information transmitted from a node to its neighbor is not based on the internal routing table maintained by the node, but is instead information concerning the interconnecting links between certain of the nodes contained in the network, but excluding interconnecting information regarding the node to whom the information is transmitted. Thus, different information is transmitted to each neighbor node. The transmitted routing information arranges the nodes of the network in a hierarchical fashion that takes on the graphical form of a tree structure with the transmitting node at the root of the tree and the remaining nodes descending from the root. Since the receiving node is excluded from this information the result is referred to as an exclusionary tree. The invention includes a method for assembling the exclusionary trees received from each neighbor node into an improved route table that may include alternate routing information, and for constructing the exclusionary trees to be sent to each neighbor as needed.

In a first embodiment the improved algorithm is shown in a form that minimizes distance, where distance is measured by total hop count, each hop contributing the same unit distance value to the total distance measurement. The alternate routing feature of this improved algorithm identifies any alternative routes having equal hop counts. This feature may be employed to provide for the use of multiple links to interconnect neighbor nodes.

In a second embodiment, the improved algorithm is shown in a form in which the distance value contributed by each hop need not be equal, but each link may contribute an arbitrarily large weighted distance to the total distance measurement. Weighted hop counts may conveniently be used to account for practical differences in delay characteristics of the communication links employed, such as differences in bandwidth of the links or in queuing delays encountered in the node and associated with the links.

BRIEF DESCRIPTION OF THE DRAWINGS

FIGS. 3, 4, and 5 show exclusionary tree routing information produced by the present embodiment for the network of FIG. 2.

DETAILED DESCRIPTION

Figure 1:
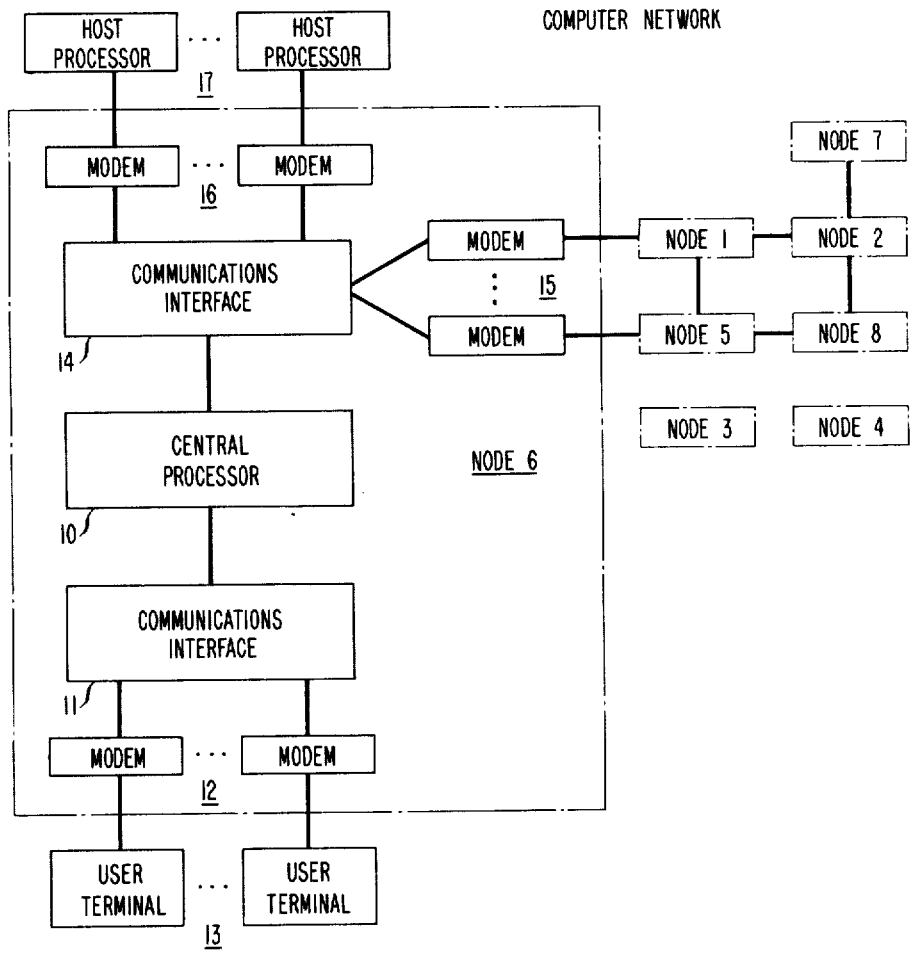
FIGS. 1 and 2 show an exemplary computer network in which the present invention may be employed.

FIG. 1 shows an exemplary computer network in which the present invention may be employed. The network comprises 8 nodes, numbered 1 through 8. Node 6 is shown in illustrative detail in one possible embodiment. The remaining nodes may be similar in construction. Central processor 10 is connected to communication interface 11 to provide low speed asynchronous communications through modems 12 to user terminals 13. Central processor 10 is connected to communications interface 14 to provide high speed synchronous communications through modems 15 with other nodes of the network and through modems 16 with host processors 17. Central processor 10 may comprise, for example, a model PDP 11/70 minicomputer from Digital Equipment Corporation with DZ11 and DQS11 interfaces 11 and 14 respectively. Modems 12 may be Bell System model 212 data sets while modems 15 and 16 may be Bell System models 208 data sets. Host processors 17 are typically large mainframe computers such as the IBM 370.

Node 6 is interconnected directly with two other nodes of the network, node 1 and node 5, which are in turn interconnected with nodes 2, 8, and 7 with high speed communication links in the pattern shown in FIG. 1. Nodes 3 and 4 have no links to the other nodes, are thus isolated from the network, and take no part in the routing of messages among the interconnected nodes. Each of the nodes is functionally similar to node 6 and each would typically have its own compliment of user terminals and host processors (not shown) which it serves. In some instances a node may have no host processors or no user terminals or neither, and may serve only to switch messages between other nodes of the network.

Users at terminals 13 may log on to one or more of the host processors 17 in an interactive time sharing mode using the packet message switching communication services of node 6. In addition, users at terminals 13 may log on to other host processors attached to any of the nodes on the network, and in turn distant users may log on to host processors 17 or any other host processors in the network with which communication can be established.

Figure 2:
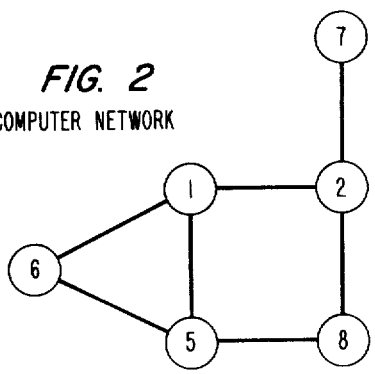

FIG. 2 shows a simplified diagram of the computer network of FIG. 1 showing only the nodes and interconnecting links. Node 1 of the network has links with nodes 6, 5, and 2 so that messages from node 1 to those nodes may be sent directly. Node 1 has no direct link to node 8 so that messages for node 8 must be routed to node 6, node 2 or node 5. The distance from node 1 to node 6, measured in the minimum number of links (hops) traversed is 1; the hop count is 1. The distance from node 1 to node 8 is 2, since a message must traverse a minimum of 2 links in a path either through node 2 or through node 5. Distances between nodes on the network may change dynamically as links go down or come up. Each such event changes the topology of the computer network and may cause the routing of messages to change. Thus for the topology shown in FIG. 2 the distance from node 1 to node 7 is 2, traversing node 2. If, however, the link between node 1 and node 2 were to go down, the distance from node 1 to node 7 would then become 4 as messages would be routed through nodes 5, 8 and 2. In the event that a new link is established between node 1 and node 7, they would become neighbors, and the distance between them would be 1. (In a second embodiment to be described below, a link may contribute a distance value greater than one, a weighted hop count, to account for unequal delays encountered in the network. In this first embodiment, each link contributes an equal unit hop count.)

Each node in the computer network manages the links between itself and its neighbors. When a link goes down, the central processor of the node is notified, typically by a hardware interrupt signal. Similar activity takes place when a link comes up. The node undertakes to modify its internal routing information and to notify its neighbor nodes that a change in network topology has taken place. According to the present invention, a node transmits routing information only to its neighbors. The distance traveled by routing messages is therefore limited.

Routing information sent to a neighbor node takes the form of an exclusionary tree. The term tree as used herein refers to an arrangement of the nodes in hierarchical structure, each node having only one parent node. More precisely, each exclusionary tree is a minimum spanning tree. Exclusionary trees are illustrated in FIGS. 3, 4, and 5.

FIG. 3 illustrates the exclusionary tree routing information transmitted from node 2 to its neighbor node 1 to describe the computer network shown in FIG. 2. An exclusionary tree is a description of some portion of the entire network according to the present information of the transmitting node, but excluding any links connected to the node to whom the routing information is being transmitted. The portion of the network included in the exclusionary tree is that portion that remains interconnected to the transmitting node after excluding the links of the receiving node. The tree is constructed from the viewpoint of the transmitting node with the transmitting node as the root of the tree and all remaining interconnected nodes depending therefrom. Thus in FIG. 3 node 2 is the transmitting node of the routing information and node 1 is the receiving node. Node 2 excludes node 1 and all links connected to node 1 from the exclusionary tree. In FIG. 3 this is illustrated in the left hand drawing by using dotted lines to represent graphically the excluded links. Having excluded node 1, node 2 constructs a tree with itself at the root. This is illustrated in the left hand drawing of FIG. 3 by using arrows from each remaining node directed toward node 2. In the right hand drawing of FIG. 3 the resulting exclusionary tree is redrawn with node 2 at the root.

FIG. 4 shows the exclusionary tree transmitted by node 5 to node 1. All links connected to node 1 are excluded and the remaining nodes of the network that are interconnected to node 5 are arranged in a hierarchical tree with node 5 as the root.

FIG. 5 shows the exclusionary tree transmitted from node 6 to node 1. Node 1 is excluded and a tree is formed with node 6 at the root. In practice, exclusionary trees are always minimum spanning trees since exclusionary trees are derived from other exclusionary trees, and are assembled in stages from information received over the network from each node in turn.

The exclusionary tree information illustrated graphically in FIGS. 3, 4, and 5 is transmitted by way of routing messages to node 1 from its neighbor nodes 6, 5 and 2. A routing message is sent from a node to its neighbor whenever there is a change in the topology of the network that results in a change from the previous routing message sent to that neighbor. For any given node such a change in topology can occur in three ways: a link connected to the node comes up, a link connected to the node goes down, or a routing message is received from a neighbor.

When a link comes up, the node at either end is notified that the link is operative by a means external to the network. In the present embodiment a hardware interrupt is supplied to processor 10 from interface 14 indicating that the link is operative, for example, that carrier is detected on the communication path. As a result, the node transmits a "hello" message over the link, but sends no further messages, and does not change its routing information until a routing message is received over the link.

Two types of control messages are used to implement the exchange of routing information. One is the routing message containing the exclusionary tree information, the other is the hello message that indicates the initiation of a link into service. The hello message is the first message sent to a neighbor over a newly established link and is an attempt to initiate network communication. It has two purposes; to communicate the node's identity (node number) and to request a routing message in return. As a response the neighbor node sends back a routing message containing an exclusionary tree. After receiving the routing message the node is free to begin sending data messages over the link.

Figures 6, 7, 8:
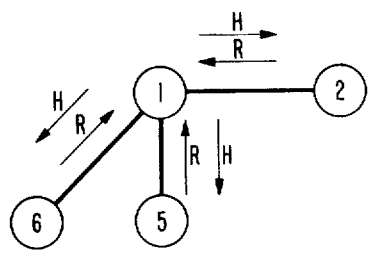
FIG. 6 illustrates an exchange of control messages in the network of FIG. 2.
FIG. 7 shows the format of a hello message used in the present embodiment.
FIG. 8 shows the format of three routing messages used in the present embodiment to transmit the exclusionary tree information of FIGS. 3, 4, and 5.

FIG. 6 shows an exchange of messages initiated by node 1. Node 1 sends a hello message to each of its neighbors and from each of its neighbors receives a routing message containing an exclusionary tree, the three exclusionary trees shown in FIGS. 3, 4, and 5. Not shown in FIG. 6 is the exchange of hello and routing messages that takes place in the other direction on each link when it comes up.

FIG. 7 shows the format of the hello message sent by node 1. Each message is comprised of header and data information. The header contains three fields; the "S" field containing the identification number of the sending node, the "D" field containing the identification number of the destination node, and the "T" field indicating the message type. The data field contains variable information. For the hello message sent from node 1 to node 2, the "S" field indicates that the transmitting node is node 1. The "T" field contains an "H" indicating a hello message. The "D" field, however, does not contain the normal identification of the destination node but contains a special indication, a zero in the present embodiment, that is not a valid node number. The same message is sent to each neighbor of node 1. The special zero indicator signifies that the first receiving node is the intended ultimate destination of the message, and that the sender node is its neighbor at the other end of the link on which the message is received. Nodes can thus communicate control messages between neighbors without knowing the neighbor's identity. This is particularly useful, for example, when a new node is introduced to the network. No special steps are taken; a link comes up between the new node and an existing node of the network, hello messages are exchanged, routing messages are exchanged, and the new node is thereby identified and assimilated into the network without special procedures.

The data field in the hellow message is a single number that indicates the version number of the routing algorithm of the sending node. The present inventive algorithm may be implemented in any number of different embodiments that practice the invention but that differ in operational details unrelated to the inventive contribution. It is convenient to identify different embodiments with different version numbers, higher version numbers typically representing embodiments designed at a later point in time and having additional capabilities over those with lower version numbers. By transmitting its version number, the node effectively notifies its neighbor of its limitations so that a node having a higher version number may modify its operation if necessary to be compatible with its neighbor. Alternatively, a node receiving a hello message may refrain from returning a routing message to a node with lower version number. This effectively prevents the neighbor from transmitting data messages over the link in the event that the algorithm versions controlling operations of the two nodes are incompatible.

FIG. 8 shows the message format of the routing messages containing the exclusionary trees shown in FIGS. 3, 4, and 5. The type "R" field shows that these messages are routing messages, the sender identification shows that the messages come from nodes 2, 5, and 6 respectively, while the destination field is zero, indicating that the message is intended for the receiving node.

The data field is an ordered sequence of numbers, representing node numbers for the exclusionary tree. The data field is of sufficient length to contain a description of a large network of arbitrary size, 256 node numbers in 256 data positions (slots) in the present embodiment. Only the contents of the first ten data slots are shown in FIG. 8, numbered zero through 9. Each numbered slot in the routing message corresponds to a node of the network. Each number filling a slot corresponds to a node of the exclusionary tree. A node number filling a slot is the node number of the parent node of the node represented by the slot number. Thus for the routing message transmitted from node 2 to node 1, a zero in slot 2 indicates that node 2 is root of the tree. Zero in this case is a special indicator since there is no node zero. Data slots 7 and 8 contain 2 indicating that nodes 7 and 8 have node 2 as their common parent. Data slot 5 contains 8 indicating that the parent of node 5 is node 8. Data slot 6 contains a 5 indicating that the parent of node 6 is node 5. It will be seen that this describes the exclusionary tree of FIG. 3. A tree structure of arbitrary form may be described in the linear array of data appearing in a routing message because of the property of a tree that each node has one and only one parent node. Therefore, for each node represented by a data slot there can be one and only one node number appearing in the respective data slot identifying the parent node. In FIG. 8 a dash appears in data slots 0, 1, 3, 4 and 9 to indicate the absence of a parent. Node number 0 is not used, and the remaining nodes do not appear in the exclusionary tree of FIG. 3.

The routing message sent from node 5 to node 1 is shown in FIG. 8 and is constructed from the tree in FIG. 4 in a similar fashion. Node 5 is the root, nodes 6 and 8 point to node 5 as the parent. Node 2 points to node 8 as the parent, and node 7 points to node 2 as the parent. Similarly, FIG. 8 shows the routing message sent from node 6 to node 1 that corresponds to the exclusionary tree of FIG. 5. Data slot 6 contains zero identifying node 6 as the root of the tree, data slot 5 contains node 6, data slot 8 contains 5, 2 contains 8, and 7 contains 2.

The exclusionary trees received by node 1 from nodes 2, 5, and 6 are retained in memory by node 1 and comprise the basic descriptive information used by node 1 to route data messages and to construct exclusionary trees for transmission to neighbor nodes. The routing of data messages is conveniently done with the aid of a route table whose construction is illustrated with the aid of FIGS. 9 and 10.

Figures 9, 10:
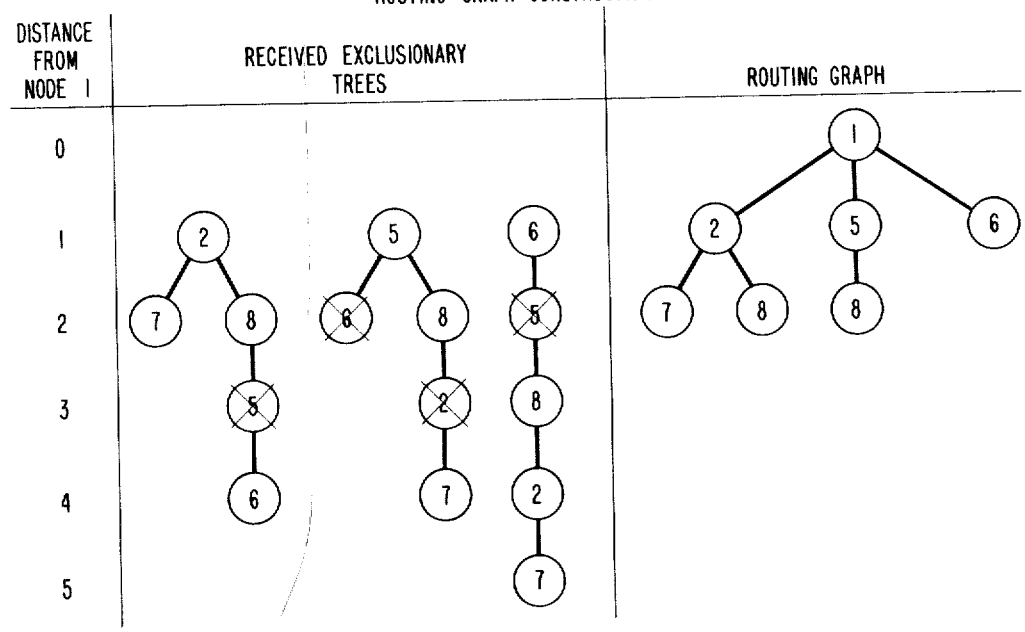
FIG. 9 shows the construction of a routing graph from exclusionary tree information.
FIG. 10 shows the construction of a route table used in the present embodiment.

FIG. 9 illustrates the construction of a routing graph by node 1 from the exclusionary trees received from nodes 2, 5, and 6. This process is shown graphically. The received exclusionary trees are arranged with their nodes descending from the root, each successive node being placed in FIG. 9 at a vertical level corresponding to its distance from node 1. Node 1 places itself at the root of the routing graph. The received exclusionary tree nodes at a distance of one are then visited in left to right order and placed in the routing graph if not already there at a lesser distance. Thus nodes 2, 5 and 6 are added to the routing graph at a distance of one and attached to node 1.

Nodes of the received exclusionary trees at a distance of two are then visited in left to right order. Node 7 is first visited, placed in the routing graph and attached to its parent node 2. Node 8 is next visited and placed in the routing graph attached to its parent node 2. Node 6 is next visited and is found in the routing graph at a distance less than two. Node 6 is therefor crossed off from the received exclusionary tree received from node 5. By being crossed off, node 6 and all its descendent nodes are disregarded and not further considered for placement in the routing graph. Still at a distance of two, node 8 is next visited. Since node 8 does not already appear in the routing graph at a distance less than two it is placed in the routing graph attached to its parent node 5. (Note that the second appearance of node 8 in the routing graph prevents the routing graph from being a tree in which only a single parent node is permitted.) Node 5 is next visited. Since node 5 already appears in the routing graph at a distance less than two, node 5 is crossed off the exclusionary tree received from node 6.

Nodes of the received exclusionary trees at a distance of three are next visited in left to right order. Node 5 is first visited. Since node 5 already appears in the routing graph at a distance less than three, node 5 is crossed off from the exclusionary tree received from node 2. Node 2 is next visited. Since node 2 already appears in the routing graph at a distance less than three, node 2 is crossed off from the exclusionary tree received from node 5. Node 8 is next visited. However, node 8 is descended from crossed off node 5. In fact all remaining nodes in the received exclusionary trees are descendents of crossed off nodes and the process is finished.

The above process of assembling received exclusionary trees into a routing graph identifies the minimum distance paths from the present node, node 1, to each other node in the network. If there are multiple equal distance paths, each is found. The routing graph of FIG. 9 shows two paths from node 1 to node 8 with distance two, one through node 2, the other through node 5.

The routing graph of FIG. 9 is useful for illustrative purposes and may be constructed, if desired, and used for routing data messages. However, routing information may be contained in a more useful form in the route table of FIG. 10 which shows the neighbor to which a data message should be routed for each destination node on the network. In FIG. 10 it is seen that a message for node 7 should be routed to node 2, and a message for node 8 may be routed to either node 2 or node 5. The selection of node 2 or 5 is made by additional criteria, for example, by selecting the node whose link has the shortest output message queue.

The route table of FIG. 10 can be constructed directly from the received exclusionary trees of FIG. 9. Each node in the received exclusionary trees is visited in the same way as illustrated above. Instead of placing a node of interest into the routing graph, the received exclusionary tree containing the node of interest is traced to its root. The root node identifies the neighbor to whom data messages should be routed to reach the node of interest. An identifier representing the neighbor node—or the link used to reach it in alternative embodiments—is placed in the route table under the entry for the node of interest. If the node of interest appears in more than one received exclusionary tree at the same distance, each root node is represented in the route table, resulting in multiple route table entries for nodes of interest that have multiple equal distance routes.

Although the routing graph and the route table are both convenient for summarizing minimum distance route information in a useful form that can be rapidly used to route data messages, neither the routing graph nor the route table are necessary for operation of the present embodiment. Each data message may be routed by using the above process to obtain route information directly from the received exclusionary trees. It will generally be preferred, however, to employ a route table in most embodiments. Other methods of using the received exclusionary trees to construct a route table will be evident from the above discussion to those skilled in the art without departing from the inventive contribution.

Figure 11:
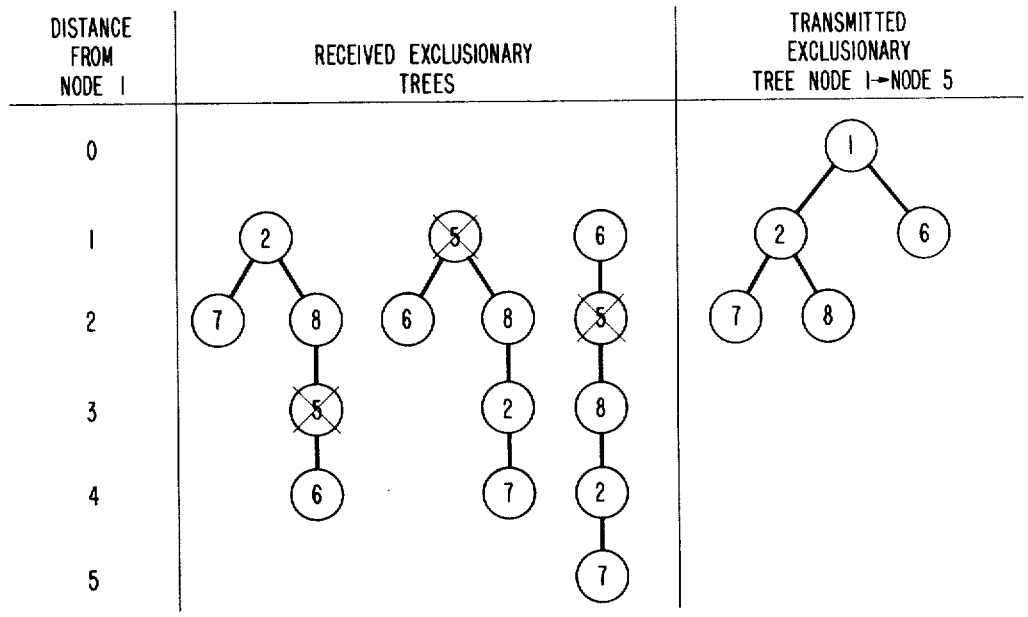
FIGS. 11 and 12 illustrate the construction of exclusionary tree information to be transmitted to a neighbor node by the present embodiment from received exclusionary tree information.
Figure 12:
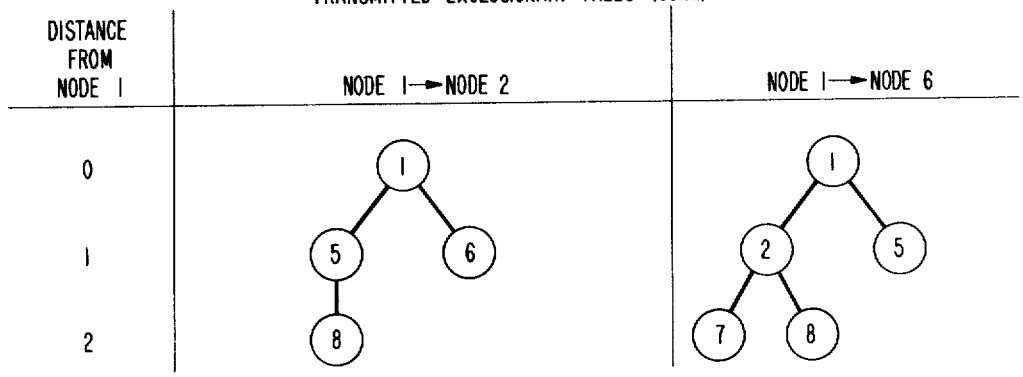

FIGS. 11 and 12 illustrate the construction of exclusionary trees to be transmitted to neighbor nodes from exclusionary trees received. The process of constructing a transmitted exclusionary tree is similar to that of constructing the routing graph with the following two exceptions: first, every appearance in the received exclusionary trees of the neighbor node to whom the transmitted exclusionary tree will be sent is crossed off at the outset. Second, only the first appearance of a node appearing more than once at the same level is included in the transmitted exclusionary tree. That is, ties are broken rather than preserved as in the routing graph.

FIG. 11 illustrates the construction of the transmitted exclusionary tree sent from node 1 to node 5. The received exclusionary tree for node 5 is crossed off, as well as every other appearance of node 5 in the received exclusionary trees. The transmitting node, node 1 in the present case, is placed at the root of the transmitted exclusionary tree. Each node at a distance of one is visited in left to right order. Node 2 is placed in the transmitted exclusionary tree and attached to node 1. Node 5 has been crossed off. Node 6 is placed in the transmitted exclusionary tree and attached to node 1. Next, all nodes at a distance of two are visited in left to right order. Node 7 is placed in the transmitted exclusionary tree and attached to node 2. Node 8 is placed in the transmitted exclusionary tree and attached to node 2. All remaining nodes at distance two or greater have already been encountered at a lesser distance, or have been crossed off, so the process is finished.

FIG. 12 illustrates the exclusionary trees transmitted to node 2 and node 6, which are formed by the above-described process after crossing off all occurrences of node 2 and node 6, respectively from the received exclusionary trees.

Figures 13, 14, 15:
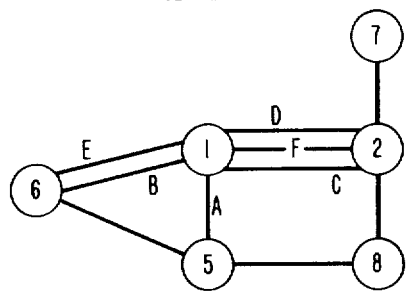
FIG. 13 shows the format of three routing messages used in the present embodiment to transmit the exclusionary trees of FIGS. 11 and 12.
FIG. 14 shows an exemplary computer network having multiple links between nodes in which the present invention may be employed.
FIG. 15 illustrates a route table for the network of FIG. 14 with alternate routing feature of the present invention.

FIG. 13 shows the routing message format of the messages that transmit the exclusionary trees of FIGS. 11 and 12 to nodes 5, 2, and 6 respectively. These are formed in the same manner as described above for FIG. 8.

Now that the processes of using received exclusionary trees to construct the route table and to construct transmitted exclusionary trees has been described, additional details of the present embodiment of the routing algorithm will be given.

A copy of the latest exclusionary tree received on each link is retained by the node. When a new exclusionary tree is received, it replaces any previous one for that link and a new route table is constructed. In case a second exclusionary tree is received on the same link before the first is processed, the first is simply discarded and replaced by the later one. All information of interest is in the latest received exclusionary tree so there is no need to process them in order and no need to use buffer space to keep old ones.

A copy of the last exclusionary tree to be transmitted on each link is also retained. In the present embodiment, this information is kept in the form of the last routing message transmitted on each link since this occupies relatively little space. After the new route table is constructed, new transmitted exclusionary trees are constructed for each link. Each new exclusionary tree is compared with the last one transmitted on the link. If the new one is different, it is transmitted over the link and replaces the old one. If the new one is the same as the previous one, it is not transmitted again. In this way the routing algorithm reaches stability, that is, routing messages will eventually stop being sent between nodes when there is no new routing information to be sent. Transmission on any given link of data messages routed according to the new route table should follow the transmission of any new exclusionary tree on that link that resulted from the same network change.

When a link comes up, a hellow message is transmitted on the link. No data messages are sent on the link unless and until a routing message is received. When a routing message (a new exclusionary tree) is received on the link, the steps described above are taken. As a consequence, data messages can then be routed over the link.

When a link goes down, the received exclusionary tree for the effected link is discarded. The received exclusionary trees that remain are used to construct a new route table and new exclusionary trees to be transmitted if different.

When a hello message is received on a link, the routing message that was last sent out on the link is retransmitted again. If there was none, a new exclusionary tree is constructed and sent on the link. In case the version number received in the hello message is different from the version number of the node, the node may take whatever steps are called for to make operation over the link compatible, or may refrain from returning a routing message and raise a maintenance alarm.

FIG. 14 shows a computer network that illustrates a feature of the present invention in accommodating multiple links between nodes. In FIG. 14 two links labeled E and B are provided between nodes 1 and 6. Three links labeled D, F, and C are provided between nodes 1 and 2. A single link labeled A is provided between nodes 1 and 5. The existence of multiple links between nodes is a matter of no concern, and does not alter any of the previous description. Each link is treated separately. Separate hello messages are sent over each link, and separate identical, routing messages. As a result, multiple links appear as alternate routes in the route table along with any alternate routes through other nodes. The contents of the routing table, FIG. 10 above may be modified to indicate multiple alternative outgoing links rather than node numbers, as shown in FIG. 15.

Figure 16:
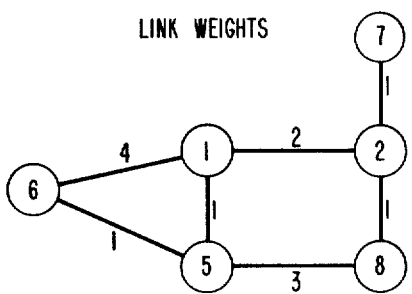
FIG. 16 shows a computer network in which a second embodiment of the present invention may be employed utilizing link weights or delay values.

FIG. 16 shows a computer network in which a second embodiment of the present invention is employed that takes into account unequal delays encountered on links. Such delays may be encountered because of link-associated queuing delays within the node, or because of reduced bandwidth on certain links in comparison with others, resulting in lower data transmission rate on some links. It is convenient to indicate delay values by an integral multiple of some unit delay value encountered on the network. In FIG. 16 the link between nodes 7 and 2 contributes a unit value of delay, while the link between nodes 1 and 2 contributes two units of delay. Each delay value is indicated in FIG. 16 by an integer adjacent to each link.

The distance of message travel for this second embodiment is measured in terms of the total delay encountered. In FIG. 16 it will be seen that the distance from node 1 to node 8 is three by way of node 2, but four by way of node 5. In this second embodiment, weights are retained within each node for those links connected to it and the exclusionary trees exchanged between nodes include this weight information.

Figure 17:
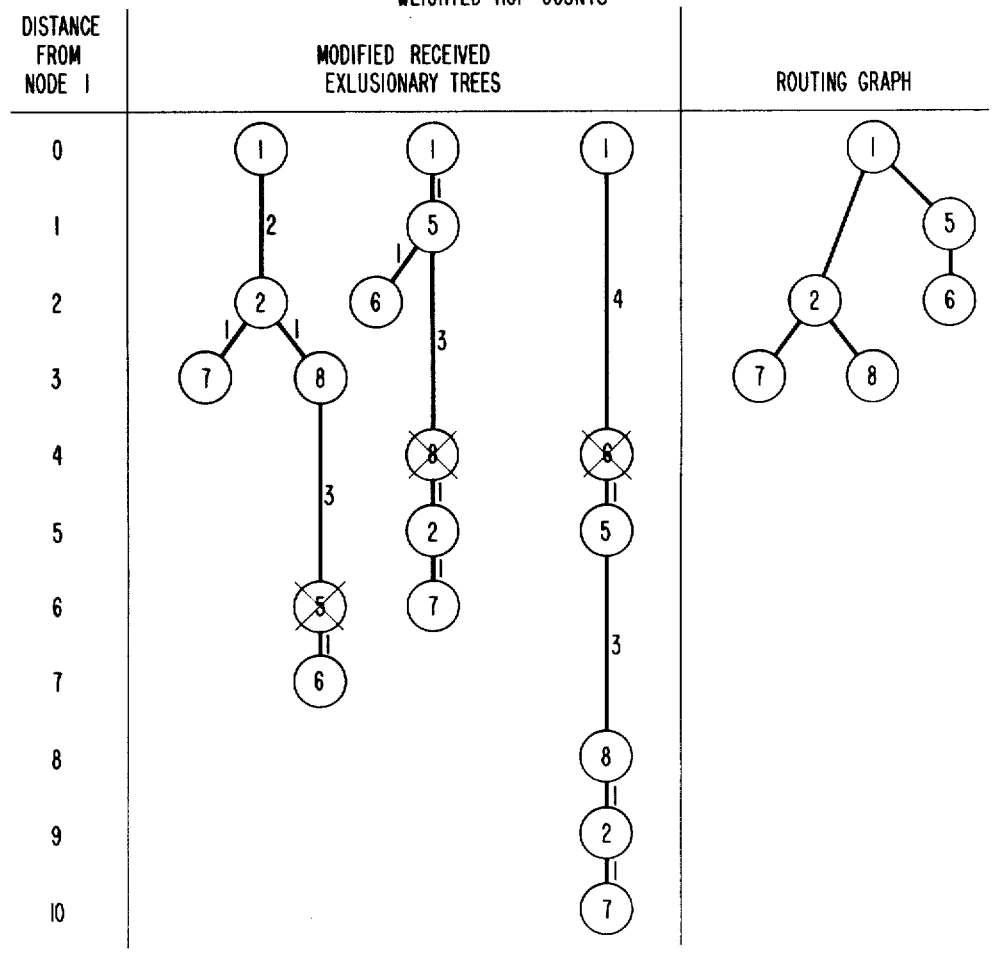
FIG. 17 shows the construction of a routing graph including weighted hop counts for the network of FIG. 16.

FIG. 17 shows routing graph construction using weighted hop counts. Node 1 receives exclusionary trees from node 6, 5 and 2 with weights for each link. Node 1 modifies each received exclusionary tree by including itself, node 1, above the root of the tree. The nodes are arranged at a distance from node 1 corresponding to the weights of each connecting link, which results in the graphical illustration of the received exclusionary trees shown in FIG. 17. For each unit distance from node 1, the nodes of the exclusionary trees are visited in left to right order as before to construct the routing graph of FIG. 17. Thus node 5 is placed in the routing graph at distance one, nodes 2 and 6 are placed in the routing graph at distance two, nodes 7 and 8 are placed in the routing graph at distance three, and all remaining nodes are crossed off as having been previously encountered at a lesser distance. As before, the routing graph of FIG. 17 is presented for graphical illustration purposes, and the associated route table of FIG. 18 may be directly constructed from the received exclusionary trees of FIG. 17. It contains the same information as the routing graph for purposes of message routing. As before, either the routing graph or the route table may be used to route data messages, or neither may be used and the received exclusionary trees may be used directly to route data messages.

Figures 18, 19:
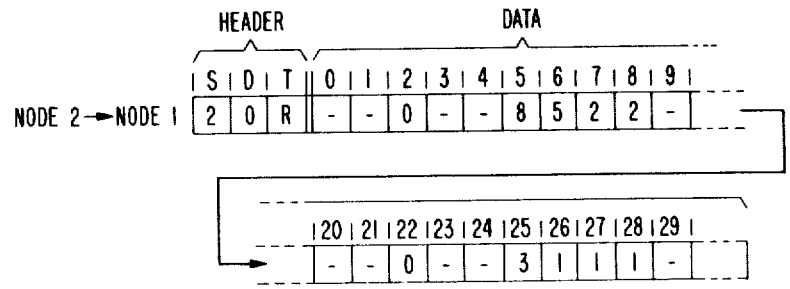
FIG. 18 shows a route table for the network of FIG. 16.
FIG. 19 shows a routing message for the network of FIG. 16 including link weight information.

It may be noted that in the table of FIG. 18, all messages are routed through either node 2 or node 5. This is consistent with the computer network shown in FIG. 16. No messages would be routed over the link between nodes 1 and 6 because of the large delay there encountered so long as other links are available. It is, therefore, quicker to send messages to node 6 via node 5 rather than to use the direct link.

FIG. 19 illustrates a modified routing message that includes weight values. FIG. 19 shows the routing message sent from node 2 to node 1. The header information and contents of the first ten data slots are the same as that shown for the node 2 message of FIG. 8. For illustrative purposes, the number of data slots available for node numbers in FIG. 19 has been reduced from that of FIG. 8 in order to accommodate weight information. Two data slots are used in this embodiment for each network node. The first contains, as before, the parent of the network node. The second contains the weight of the link connecting to the parent.

Data slots 20 through 29 are in direct correspondence with data slots zero through 9 and indicate the weight value of the corresponding link. Thus data slot 22 corresponds with data slot 2 and contains no information since node 2 is the root of the exclusionary tree. Data slot 25 corresponds with data slot 5 and indicates that the link from node 5 to its parent node 8 contributes a weight of three. Data slot 26 corresponds with data slot 6 indicating that the link of node 6 to its parent node 5 carries a weight of one. Similarly, data slots 27 and 28 correspond respectively to data slots 7 and 8 and indicate that the links from node 7 and 8 respectively to their common parent, node 2, each carry a respective weight of one.

Construction of the transmitted exclusionary trees from the received exclusionary trees proceeds in the manner previously described, but only after the node 1 that was appended to each received exclusionary tree for purposes of FIG. 17 is removed.

The processes illustrated above and described in detail below that form part of the present invention may be implemented in the network nodes in any of several different ways. They may, for example, be implemented by one or more computer programs that execute in one or more computers in each node. Or they may be implemented in special hardware that stands alone, or that operates in conjunction with a computer in each node. Many other possible implementations will be evident to those skilled in the art without departing from the inventive contribution herein.

The preferred embodiment disclosed below is by way of a properly programmed digital computer. Only one such program procedure is shown below although any number of different programs may achieve the same inventive result. The procedures shown below describe in detail steps that may be executed in one embodiment of the present invention in response to certain events that occur at a network node. From these procedures detailed computer programs can be prepared by those with skill in the art.

ROUTING AALGORITHM PROCEDURES

Process: Hello_Received

Step 1: Compare the version number in the hello message with the version number currently implemented in this node. If the received hello message version number is earlier than the currently implemented version, note that fact for this link.

Step 2: If the link was previously down, go to step 6.

Step 3: If the node number identifying the neighbor is different than the previous value (if, for example, the link has been physically rearranged and now connects to a neighbor node that is different from the previous one connected over this link) go to step 5.

Step 4: Send another copy of the last routing message sent over this link. Stop.

Step 5: Perform process Link_Failed for this link.

Step 6: Save the number of the node at the other end of the link. Perform process Exclusionary_Tree for this link to construct and send a routing message. Stop.

Process: Link_Failed

Step 1: Discard the exclusionary tree, if any, last received from this link.

Step 2: Mark this link as down.

Step 3: Perform process Run_Algorithm. Stop.

Process: Routing_Received

Step 1: Discard the exclusionary tree, if any, last received from this link.

Step 2: Convert the routing message into the tree representation (if this has not already been done), taking into account any variations due to an earlier algorithm version being employed by the node attached to this link. This tree is constructed by hanging the tree received over the link from a root node representing the receiving node. For each node in the tree, note the distance that node is from the root of the tree by totaling the weights of the branches leading up to the root. Save the tree, but omitting the root node.

Step 3: Perform process Run_Algorithm. Stop.

Process: Run_Algorithm

Step 1: Prepare a list of all nodes in all the received exclusionary trees sorted in order of increasing distance from this node. Note with each entry in this list the link from which the tree containing the node came. Save this sorted list.

Step 2: Perform process Generate_Route_Table.

Step 3: For each link that is up, perform process Exclusionary_Tree for that link to compute and possibly send a routing message. Stop.

Process: Generate_Route_Table

Step 1: Discard the existing route table.

Step 2: Visit each node in the previously sorted list in the order of increasing distance. For each node visited:

Step 2A: If the node is already crossed off (by a previous operation of Step 2C) go to Step 2E.

Step 2B: If there is no entry in the route table for this node number, or if the entries already in the route table for this node are the same distance from the root as the visited node, go to Step 2D.

Step 2C: Cross off (for the duration of this process) the visited node and all nodes below it in the tree. Go to Step 2E.

Step 2D: Add an entry to the route table list for this node specifying the link from which the exclusionary tree containing the visited node was received as well as the distance associated with the node.

Step 2E: Continue visiting nodes in the sorted list.

Step 3: Stop when the end of the sorted list is reached.

Process: Exclusionary_Tree (Create an exclusionary tree for one link.)

Step 1: Begin creating the tree by placing the transmitted node at the root.

Step 2: Go through the exclusionary trees received from all working links and cross off (for the duration of this process) any nodes having the same number as the node on the other end of this link (the source node number received in the hello message) and all their descendant nodes.

Step 3: Visit each node in the previously sorted list in the order of increasing distance. For each node visited:

Step 3A: If this node is already crossed off, go to Step 3F.

Step 3B: If a node having the same number as the visited node is already in the tree being created, go to step 3D.

Step 3C: Put a node having the same number as the visited node in the tree being created, joining it to the node already in the tree being created having the same number as the parent of the node being visited. Give the added branch the same weight as that of the branch between the visited node and its parent. Go to Step 3F.

Step 3D: If the visited node has a distance equal to that of node with the same number already in the tree being created, go to Step 3F.

Step 3E: Cross off (for the duration of this process) the visited node and all nodes below it in the tree.

Step 3F: Continue visiting nodes in the sorted list.

Step 4: Convert the exclusionary tree just created to the format of a routing message and discard the tree.

Step 5: If the routing message just created is identical to the last one sent over this link, stop.

Step 6: Replace the previous routing message for this link with the newly created message. Transmit the new routing message over this link. Stop.

The attached APPENDIX contains a computer program implementation of the present invention, a test program that exercises the implementation, and sample output that illustrates its operation. The programs are written in the C programming language (*The C Programming Language*, Kernighan and Ritchie, Prentice Hall, 1978) and for purposes of illustration here, were run under an operating system available under the tradename UNIX from American Telephone and Telegraph Co.

The test program test.c sends hello and routing messages to the implementation program burp.c. The implementation program performs an embodiment of the inventive method, receiving messages from test.c, converting received routing messages to a more convenient form of received exclusionary trees, constructing a route table from the received exclusionary trees, constructing transmitted exclusionary trees and corresponding routing messages, and transmitting routing messages to test.c. The test program prints the resulting messages received from burp.c and the route table constructed by burp.c.

For illustration, both programs operate either with equal link weights or with unequal link weights in order to illustrate embodiments with and without weighted hop counts. The embodiments are selected by the programs statements at line 13 in burp.c and line 10 in test.c. These two statements control the conditional compilation of subsequent statements in the respective programs that change the weights assigned to the links of the network.

The network described by the routing messages sent by test.c at lines 42 through 56 is that shown in FIG. 2, for unweighted links, and FIG. 16 for weighted links, with an additional link added between node 1 and node 5 (having weight 1) to illustrate the multiple link feature of the invention.

The implementation program assumes the role of node 1 while the test program assumes the roles of nodes 2, 5 and 6 and the links connecting them to node 1. Since multiple links are illustrated, each link is identified by a number, link 1 connecting to node 2, links 2 and 4 connecting to node 5, and link 3 connecting to node 6.

After the network is established by exchanges of hello and routing messages, the test program causes two of the links to fail, links 2 and 4, with the statements at lines 58 through 62. The implementation program responds by transmitting new exclusionary trees and constructing a new route table as seen in the sample output.

Two sets of sample output are provided, the first resulting from the programs being run with unweighted links (output.nowts), and the second resulting from the programs being run with weighted hop counts (output.whc). Sample output lines beginning with the * character indicate routing messages sent by the test program.

APPENDIX

G. G. Riddle   Case 1

```
1    /*
2     * Embodiment of Routing Method in the C language
3     */
4
5    /*
6     * Implementation-dependent Parameters
7     */
8
9    #define MYNODENUMBER    1
10   #define MAXNODE         9
11   #define MAXLINK         7
12
13   #define WEIGHTEDHOPCOUNTS    /* change '#undef' to '#define' in this line for weighted hop counts */
14
15
16   #ifdef WEIGHTEDHOPCOUNTS
17
18   #       define WEIGHT(m, node)    m[MAXNODE+1 + node]    /* where to find the weight in the routing message */
19   #       define MSGSIZE            (2*MAXNODE+2)
20   #       define LINKWEIGHTS        2,1,4,1,1,1,1
21
22   #else
23
24   #       define WEIGHT(m, node)    1
25   #       define MSGSIZE            (MAXNODE+1)
26   #       define LINKWEIGHTS        1,1,1,1,1,1,1    /* must have exactly MAXLINK entries */
27
28   #endif
29
30   #define LINKDOWN    0      /* 'whois' value for broken links */
31
32   #define ROOT        0      /* root indicator in routing message */
33   #define NOTHERE     255    /* unreachable node in routing message */
34
35   #define TRUE        1
36   #define FALSE       0
37   #define NILT        (struct tree *) 0    /* represents empty tree */
38   #define NILL        (struct list *) 0    /* represents empty list */
39
40   /*
41    * Tree and List data structures
42    */
43
44   struct tree {
45           struct tree    *next;            /* next node in this exclusionary tree */
46           int            linkfrom;         /* which link did this tree come from */
47           int            distancetoroot;   /* total of hop weights to the root */
48           int            nodenumber;
49           int            hopweight;        /* for the link between this node and its parent */
50           struct tree    *parent;          /* in the tree */
51   };
52
53   struct list {
54           struct list    *next;
55           int            link;             /* link referenced by this node */
56           int            distance;         /* from the root */
```

```
 57          struct tree    *tree;          /* pointer to node in an exclusionary tree */
 58     };
 59
 60     /*
 61      * Data kept by the Method
 62      */
 63
 64          int            whois[MAXLINK+1];       /* number of node attached to each link */
 65          unsigned char  *message[MAXLINK+1];    /* last routing message sent over each link */
 66          struct tree    *tree[MAXLINK+1];       /* last exclusionary tree received over each link */
 67
 68          int            linkweight[MAXLINK+1] = {
 69                                0, LINKWEIGHTS
 70                                };
 71
 72          struct list    *sortedlist, *crossedoff;
 73
 74          struct tree    roothead = {
 75                                NILT, 0, 0, MYNODENUMBER,
 76                                0, NILT
 77                                }, *root = &roothead;   /* my node, from which the neighbors' trees are hung */
 78
 79     /*
 80      * Function declarations
 81      */
 82
 83          struct tree    *msgtotree(), *isintree(), *putintree(), *newtreeentry();
 84          struct list    *putinlist(), *newlistentry();
 85          unsigned char  *copyof();
 86          char           *calloc();
 87
 88     /*############### External Interfaces ###############################*/
 89
 90     /*
 91      * Route Table used to route data messages
 92      *
 93      * There is an entry for each reachable node which gives a list of all
 94      * links having shortest-distance paths.
 95      */
 96
 97          struct list    *RouteTable[MAXNODE+1];
 98
 99
100     /*
101      * Process Hello message
102      *
103      *    link     = link on which the Hello message was received
104      *    fromnode = number of the node that sent the Hello
105      *    version  = version number of the Method implemented by the Hello sender
106      */
107
108     HelloReceived(link, fromnode, version)
109          int            link, fromnode, version;
110     {
111
112          /* check version here */
113
114          if(fromnode == whois[link])
115                 SendMsg(link, message[link], MSGSIZE);
116          else{
117                 if(whois[link] != LINKDOWN)
118                        LinkFailed(link);
119
120                 whois[link] = fromnode;
121
122                 exclusionarytree(link);
123          }
124     }
125
126     /*
127      * Process Routing message.
128      *
129      *    link = link number on which the message was received
130      *    msg  = data portion of the received routing message
131      */
132
133     RoutingReceived(link, msg)
134          int            link;
135          unsigned char  msg[];
136     {
137          tosstree(tree[link]);
138
139          tree[link] = msgtotree(link, msg);
140
141          runalgorithm();
142     }
143
144     /*
145      * A Link has failed
146      *
147      *    link  = number of the newly failed link
148      */
149
150     LinkFailed(link)
151          int            link;
152     {
153          tosstree(tree[link]);
154          tree[link] = NILT;
155
156          whois[link] = LINKDOWN;
157
158          runalgorithm();
159     }
160
161     /*###############################################################*/
162
```

```
163     /*
164      * Generate a new route table and send any necessary routing messages to our neighbors.
165      */
166
167     runalgorithm()
168     {
169             int             i;
170
171             sortbydistance();
172
173             generateroutetable();
174
175             for(i = 1; i <= MAXLINK; i++)
176                     if(whois[i] != LINKDOWN)
177                             exclusionarytree(i);
178     }
179
180     /*
181      * Generate our route table from the received exclusionary trees
182      *
183      *      RouteTable:     list of shortest-path links for each reachable node
184      */
185
186     generateroutetable()
187     {
188             int             i, node;
189             struct list     *lp, *nl;
190
191             tosslist(crossedoff);
192             crossedoff = NILL;
193
194             for(i = 1; i <= MAXNODE; i++){
195                     tosslist(RouteTable[i]);
196                     RouteTable[i] = NILL;
197             }
198
199             for(lp = sortedlist; lp != NILL; lp = lp->next)
200                     if(!iscrossedoff(lp->tree)){
201                             node = lp->tree->nodenumber;
202                             if((RouteTable[node] == NILL) ||
203                                (RouteTable[node]->distance == lp->distance)){
204                                     nl = newlistentry();
205                                     nl->link = lp->link;
206                                     nl->distance = lp->distance;
207
208                                     nl->next = RouteTable[node];
209                                     RouteTable[node] = nl;
210                             }else
211                                     crossoff(lp->tree);
212                     }
213     }
214
215     /*
216      * Generate the exclusionary tree for a link and send a Routing message
217      * if it has changed
218      *
219      *      link    = link for which tree is to be computed
220      */
221
222     exclusionarytree(link)
223             int             link;
224     {
225             int             i;
226             struct tree     *tp, *ep, *excltree;
227             struct list     *lp;
228             unsigned char   msg[MSGSIZE];
229
230             tosslist(crossedoff);
231             crossedoff = NILL;
232
233             for(i = 1; i <= MAXLINK; i++)
234                     for(tp = tree[i]; tp != NILT; tp = tp->next)
235                             if(tp->nodenumber == whois[link])
236                                     crossoff(tp);
237
238             excltree = newtreeentry();
239             excltree->nodenumber = root->nodenumber;
240
241             for(lp = sortedlist; lp != NILL; lp = lp->next){
242                     tp = lp->tree;
243
244                     if(!iscrossedoff(tp))
245                             if((ep = isintree(excltree, tp->nodenumber)) != NILT){
246                                     if(tp->distancetoroot > ep->distancetoroot)
247                                             crossoff(tp);
248                             }else
249                                     putintree(excltree, (unsigned char *) "", tp->nodenumber,
250                                             tp->parent->nodenumber, tp->linkfrom, tp->hopweight);
251             }
252
253             treetomsg(excltree, msg);
254
255             if(different(msg, message[link], MSGSIZE)){
256                     tossmsg(message[link]);
257                     message[link] = copyof(msg, MSGSIZE);
258
259                     SendMsg(link, message[link], MSGSIZE);
260             }
261
262             tosstree(excltree);
263     }
264
265     /*############### Tree to Routing message conversions ###################*/
266
267     /*
```

```
 * Convert Routing message to tree structure
 *
 * During this conversion process, the total distance from my node is computed
 * for each node in the tree.
 *
 *      link    = link from which message came
 *      msg     = character array containing the routing message
 *                (and weights if applicable)
 *      return  = pointer to root of tree built, the root points to the neighbor node
 */ struct tree *
msgtotree(link, msg)
        int             link;
        unsigned char   msg[];
{
        struct tree     *head;
        int             i;

for(i = 1; i <= MAXNODE; i++)
                if((msg[i] != NOTHERE) && !isintree(root, i))
                        putintree(root, msg, i, (int) msg[i], link, WEIGHT(msg, i));

head = root->next;
        root->next = NILT;

return(head);
}

/*
 * Convert a tree to the Routing message data format
 *
 *      h       = head of tree to be converted
 *      msg     = character array where the Routing message data will be stored
 */ treetomsg(h, msg)
        struct tree     *h;
        unsigned char   msg[];
{
        int             i;
        struct tree     *tp;

for(i = 0; i < MSGSIZE; i++)
                msg[i] = NOTHERE;

msg[h->nodenumber] = ROOT;

for(tp = h->next; tp != NILT; tp = tp->next){
                msg[tp->nodenumber] = tp->parent->nodenumber;

#ifdef WEIGHTEDHOPCOUNTS

WEIGHT(msg, tp->nodenumber) = tp->hopweight;

#endif

}
}

/*************** Tree and List manipulation *************************/

/*
 * Find a node in an exclusionary tree
 *
 *      h       = head of the tree to be searched
 *      node    = number of the node to search for
 *      return  = pointer to the node in the tree with this number
 *              | NIL if no node with this number is in the tree
 */ struct tree *
isintree(h, node)
        struct tree     *h;
        int             node;
{
        struct tree     *tp;

for(tp = h; tp != NILT; tp = tp->next)
                if(tp->nodenumber == node)
                        return(tp);
        return(NILT);
}

/*
 * Add a node to a tree
 *
 * This routine is invoked recursively if the parent is not already in the tree.
 * The distance computation is also done here.
 *
 *      h       = tree head
 *      msg     = routing message (necessary only for recursive invocation)
 *      node    = number of the node to add
 *      parentnumber = number of the parent of the added node
 *      link    = which link is associated with this tree
 *      weight  = of the added branch
 *      return  = pointer to the added node
 */ struct tree *
putintree(h, msg, node, parentnumber, link, weight)
        struct tree     *h;
        unsigned char   msg[];
        int             node, parentnumber, link, weight;
{
```

```
            struct tree      *tp, *q, *parent;

tp = newtreeentry();
            tp->linkfrom = link;

if(parentnumber == ROOT){
                    parentnumber = root->nodenumber;
                    weight = linkweight[link];
            } tp->nodenumber = node;
            tp->hopweight = weight;

if((parent = isintree(h, parentnumber)) == NILT)
                    parent = putintree(h, msg, parentnumber, (int) msg[parentnumber],
                        link, WEIGHT(msg, parentnumber));

tp->parent = parent;

for(q = h; q->next != NILT; q = q->next)
                    /* find list end */ ;
            q->next = tp;

tp->distancetoroot = tp->hopweight + tp->parent->distancetoroot;

return(tp);
    }

/*
     * Sort all the nodes in the received exclusionary trees by
     * increasing distance from my node
     *
     *      sortedlist:     created list of all nodes, sorted
     */ sortbydistance()
    {
            int             link;
            struct tree     *tp;

tosslist(sortedlist);
            sortedlist = newlistentry();
            sortedlist->tree = root;

for(link = 1; link <= MAXLINK; link++)
                    for(tp = tree[link]; tp != NILT; tp = tp->next)
                            putinlist(sortedlist, tp, link, tp->distancetoroot);
    }

/*
     * Add an entry to a list
     *
     *      h        = head of the list
     *      tp       = tree pointer, if any, to be saved in the list
     *      link     = link number to be saved with this list entry
     *      distance = distance to be saved
     *      return   = pointer to the added list entry
     */ struct list *
    putinlist(h, tp, link, distance)
            struct list     *h;
            struct tree     *tp;
            int             link, distance;
    {
            struct list     *lp, *pn, *nl;

for(lp = h; ((pn = lp->next) != NILL) && (distance >= pn->distance); lp = pn)
                    /* find insertion point */ ;

nl = newlistentry();
            nl->tree = tp;
            nl->link = link;
            nl->distance = distance;

nl->next = pn;
            lp->next = nl;

return(nl);
    }

/*
     * Is this part of the tree crossed off?
     *
     *      tp     = pointer to the node to check
     *      return = TRUE if it is crossed off
     *             | FALSE if not
     */ iscrossedoff(tp)
            struct tree     *tp;
    {
            struct list     *lp;

if(tp->nodenumber == root->nodenumber)
                    return(FALSE);
            else{
                    for(lp = crossedoff; lp != NILL; lp = lp->next)
                            if(lp->tree == tp)
                                    return(TRUE);

return(iscrossedoff(tp->parent));
            }
    }

/*
```

```
 * Cross off a node and subtree below
 *
 *      tp      = head of subtree to cross off
 *      crossedoff:     updated list of nodes crossed off so far
 */ crossoff(tp)
        struct tree     *tp;
{
        struct list     *nl;

nl = newlistentry();
        nl->tree = tp;
        nl->next = crossedoff;
        crossedoff = nl;
}

/*############### Memory management ###############################*/

/*
 * Make a Tree entry
 *
 *      return  = pointer to memory where a tree node may be placed
 */ struct tree *
newtreeentry()
{
        return((struct tree *) calloc(1, sizeof(struct tree)));
}

/*
 * Free the memory associated with a tree
 *
 *      h       = head of tree to release
 */ tosstree(h)
        struct tree     *h;
{
        struct tree     *tp, *nt;

for(tp = h; tp != NILT; tp = nt){
                nt = tp->next;
                free((char *) tp);
        }
}

/*
 * Make a list entry
 *
 *      return  = address of memory for a new list entry
 */ struct list *
newlistentry()
{
        return((struct list *) calloc(1, sizeof(struct list)));
}

/*
 * Free the memory used by a list
 *
 *      h       = head of list to free
 */ tosslist(h)
        struct list     *h;
{
        struct list     *lp, *nl;

for(lp = h; lp != NILL; lp = nl){
                nl = lp->next;
                free((char *) lp);
        }
}

/*
 * Make a copy of a routing message in heap storage
 *
 *      msg     = message to copy
 *      len     = number of bytes in the message
 *      return  = pointer to the copy
 */ unsigned char *
copyof(msg, len)
        unsigned char   msg[];
        int             len;
{
        unsigned char   *mc;
        int             i;

mc = (unsigned char *) calloc(1, len);

for(i = 0; i < len; i++)
                mc[i] = msg[i];

return(mc);
}

/*
 * Free to storage used by a message copy
 *
 *      msg     = pointer to message to free
 */
```

```
tossmsg(msg)
        unsigned char   *msg;
{
        if(msg)
                free((char *) msg);
}

/*
 * Determine if two messages are the same
 *
 *      a, b    = pointers to the messages to compare
 *      len     = length of each
 *      return  = TRUE if they are different
 *              | FALSE if they are the same
 */ different(a, b, len)
        unsigned char   a[], b[];
        int             len;
{
        int             i;

for(i = 0; i < len; i++)
                if(a[i] != b[i])
                        return(TRUE);

return(FALSE);
}
#include <stdio.h>

/*
 * Parameter and structure definitions must be the same in all modules
 */ define MAXNODE         9
define NOTHERE         255 define WEIGHTEDHOPCOUNTS      /* change '#undef' to '#define' in this line for weighted hop counts */ ifdef WEIGHTEDHOPCOUNTS define WEIGHT(m, node)  m[MAXNODE+1 + node]    /* where to find the weight in the routing message */
define MSGSIZE          (2*MAXNODE+2)
define LINKWEIGHTS      2,1,4,1,1,1,1 else define WEIGHT(m, node)  1
define MSGSIZE          (MAXNODE+1)
define LINKWEIGHTS      1,1,1,1,1,1,1   /* must have exactly MAXLINK entries */ endif struct list {
        struct list     *next;
        int             link;           /* link referenced by this node */
        int             distance;       /* from the root */
        struct tree     *tree;          /* pointer to node in an exclusionary tree */
};

extern struct list      *RouteTable[];

/*
 * Simulate external events occurring on the links
 */ main()
{
        sayhello(1, 2);
        sendr(1, "--0--8522-", "-----3111-");

sayhello(2, 5);
        sendr(2, "--8--0525-", "--1---113-");

sayhello(3, 6);
        sendr(3, "--8--6025-", "+-1--1-13-");

prt();

sayhello(4, 5);
        sendr(4, "--8--0525-", "--1---113-");

prt();

lfail(2);
        prt();

lfail(4);
        prt();
}

/*
 * Simulate Hello Message arrival
 */ sayhello(link, node)
{
        printf("Link %d Node %d says Hello\n", link, node);

HelloReceived(link, node, 1);
} unsigned char   rmsg[MSGSIZE];  /* place to construct a routing message */
```

```
 78    /*
 79     * Simulate the arrival of a Routing Message on a link
 80     */
 81
 82    sendr(link, mstr, wts)
 83            char         *mstr, *wts;
 84    {
 85            int          i;
 86
 87    #ifdef WEIGHTEDHOPCOUNTS
 88
 89            printf("Link %d receives Routing Message '%s'/'%s'\n", link, mstr, wts);
 90    #else
 91            printf("Link %d receives Routing Message '%s'\n", link, mstr);
 92    #endif
 93
 94            for(i = 0; i <= MAXNODE; i++)
 95                    if(mstr[i] == '-')
 96                            rmsg[i] = NOTHERE;
 97                    else
 98                            rmsg[i] = mstr[i] - '0';
 99
100    #ifdef WEIGHTEDHOPCOUNTS
101
102            for(i = 0; i <= MAXNODE; i++)
103                    if(wts[i] == '-')
104                            WEIGHT(rmsg, i) = NOTHERE;
105                    else
106                            WEIGHT(rmsg, i) = wts[i] - '0';
107
108    #endif
109
110            RoutingReceived(link, rmsg);
111    }
112
113    /*
114     * This routine is called to transmit a Routing Message over a link.
115     *
116     * Instead, we just print it.
117     */
118
119    SendMsg(link, msg, msglength)
120            unsigned char  msg[];
121    {
122            int            i;
123
124            printf("* Routing Message '");
125
126            for(i = 0; i <= MAXNODE; i++)
127                    if(msg[i] == NOTHERE)
128                            printf("%c", '-');
129                    else
130                            printf("%c", msg[i] + '0');
131
132    #ifdef WEIGHTEDHOPCOUNTS
133
134            printf("'/'");
135
136            for(i = 0; i <= MAXNODE; i++)
137                    if(WEIGHT(msg, i) == NOTHERE)
138                            printf("%c", '-');
139                    else
140                            printf("%c", WEIGHT(msg, i) + '0');
141
142    #endif
143
144            printf("' sent on Link %d\n", link);
145            fflush(stdout);
146    }
147
148    /*
149     * Simulate Link failure
150     */
151
152    lfail(link)
153    {
154            printf("Link %d Fails\n", link);
155
156            LinkFailed(link);
157    }
158
159    /*
160     * Print the Route Table
161     */
162
163    prt()
164    {
165            struct list    *lp;
166            int            i;
167
168            printf("Route Table:\n");
169
170            for(i = 1; i <= MAXNODE; i++)
171                    if(lp = RouteTable[i]){
172                            printf("  to Node %d use Link %d", i, lp->link);
173                            while(lp = lp->next)
174                                    printf(" or %d", lp->link);
175                            printf("\n");
176                    }
177    }
```

```
1   Link 1 Node 2 says Hello
2   * Routing Message '-0--------' sent on Link 1
3   Link 1 receives Routing Message '--0--8522-'
4   Link 2 Node 5 says Hello
5   * Routing Message '-01----22-' sent on Link 2
6   Link 2 receives Routing Message '--8--0525-'
7   * Routing Message '-0---15-5-' sent on Link 1
8   Link 3 Node 6 says Hello
9   * Routing Message '-01--1-22-' sent on Link 3
10  Link 3 receives Routing Message '--8--6025-'
11  * Routing Message '-0---11-5-' sent on Link 1
12  * Routing Message '-01---122-' sent on Link 2
13  Route Table:
14      to Node 1 use Link 0
15      to Node 2 use Link 1
16      to Node 5 use Link 2
17      to Node 6 use Link 3
18      to Node 7 use Link 1
19      to Node 8 use Link 2 or 1
20  Link 4 Node 5 says Hello
21  * Routing Message '-01---122-' sent on Link 4
22  Link 4 receives Routing Message '--8--0525-'
23  Route Table:
24      to Node 1 use Link 0
25      to Node 2 use Link 1
26      to Node 5 use Link 4 or 2
27      to Node 6 use Link 3
28      to Node 7 use Link 1
29      to Node 8 use Link 4 or 2 or 1
30  Link 2 Fails
31  Route Table:
32      to Node 1 use Link 0
33      to Node 2 use Link 1
34      to Node 5 use Link 4
35      to Node 6 use Link 3
36      to Node 7 use Link 1
37      to Node 8 use Link 4 or 1
38  Link 4 Fails
39  * Routing Message '-0---61-5-' sent on Link 1
40  * Routing Message '-0'--8-22-' sent on Link 3
41  Route Table:
42      to Node 1 use Link 0
43      to Node 2 use Link 1
44      to Node 5 use Link 3
45      to Node 6 use Link 3
46      to Node 7 use Link 1
47      to Node 8 use Link 1
```

```
1   Link 1 Node 2 says Hello
2   * Routing Message '-0--------'/'----------' sent on Link 1
3   Link 1 receives Routing Message '--0--9522-'/'-----3111-'
4   Link 2 Node 5 says Hello
5   * Routing Message '-01----22-'/'--2----11-' sent on Link 2
6   Link 2 receives Routing Message '--8--0525-'/'--1---113-'
7   * Routing Message '-0---15-5-'/'-----11-3-' sent on Link 1
8   Link 3 Node 6 says Hello
9   * Routing Message '-01--1-22-'/'--2--1-11-' sent on Link 3
10  Link 3 receives Routing Message '--8--6025-'/'--1--1-13-'
11  * Routing Message '-01---122-'/'--2---411-' sent on Link 2
12  Route Table:
13      to Node 1 use Link 0
14      to Node 2 use Link 1
15      to Node 5 use Link 2
16      to Node 6 use Link 2
17      to Node 7 use Link 1
18      to Node 8 use Link 1
19  Link 4 Node 5 says Hello
20  * Routing Message '-01---122-'/'--2---411-' sent on Link 4
21  Link 4 receives Routing Message '--8--0525-'/'--1---113-'
22  Route Table:
23      to Node 1 use Link 0
24      to Node 2 use Link 1
25      to Node 5 use Link 4 or 2
26      to Node 6 use Link 4 or 2
27      to Node 7 use Link 1
28      to Node 8 use Link 1
29  Link 2 Fails
30  Route Table:
31      to Node 1 use Link 0
32      to Node 2 use Link 1
33      to Node 5 use Link 4
34      to Node 6 use Link 4
35      to Node 7 use Link 1
36      to Node 8 use Link 1
37  Link 4 Fails
38  * Routing Message '-0---61-5-'/'-----14-3-' sent on Link 1
39  * Routing Message '-01--8-22-'/'--2--3-11-' sent on Link 3
40  Route Table:
41      to Node 1 use Link 0
42      to Node 2 use Link 1
43      to Node 5 use Link 3
44      to Node 6 use Link 3
45      to Node 7 use Link 1
46      to Node 8 use Link 1
```

What is claimed is:

1. In a computer network comprising a plurality of nodes, the method of routing messages among said nodes comprising the following steps for each node:
receiving a first exclusionary tree from at least one neighbor node,
constructing at least a second exclusionary tree from said first exclusionary tree,
transmitting said second exclusionary tree to a neighbor node, and
routing messages according to the information in said first exclusionary tree.

2. In a computer network comprising a plurality of nodes and a plurality of links, the method of routing messages over said links comprising the following steps for each node:
receiving a first exclusionary tree over at least one of said links,
constructing at least a second exclusionary tree from said first exclusionary tree,
transmitting said second exclusionary tree over one of said links, and
routing messages according to the information in said first exclusionary tree.

3. The method as set forth in either claim 1 or claim 2 wherein said step of routing messages according to the information in said first exclusionary tree comprises the steps of
constructing an intermediate form of the information contained in said first exclusionary tree, and
routing messages according to the information in said intermediate form.

4. The method as set forth in claim 3 wherein said intermediate form comprises a routing graph.

5. The method as set forth in claim 3 wherein said intermediate form comprises a route table.

6. In a computer network comprising a plurality of nodes and a plurality of links, the method of routing messages among the nodes comprising the following steps for each node:
receiving a plurality of exclusionary trees, one over each of a plurality of links,
constructing from the received exclusionary trees a plurality of new exclusionary trees, one for each of the links,
transmitting said one of the new exclusionary trees over each of the links,
constructing a route table from the received exclusionary trees, and
routing messages according to the information in the route table.

7. The method as set forth in claim 6 further comprising the steps of:
retaining the received exclusionary trees,
receiving a new exclusionary tree over one of said plurality of links, and
replacing the retained exclusionary tree received from said one link with the new received exclusionary tree.

8. The method as set forth in claim 7 further comprising the steps of:
receiving a second new exclusionary tree over said one link before the above recited step of replacing is performed,
discarding first said new exclusionary tree, and
replacing the retained exclusionary tree received over said one link with said second new received exclusionary tree.

9. The method of claim 6 further comprising the steps of:
detecting the occurrence of a new link coming up, and
transmitting a hello message on said new link, said hello message including information identifying the transmitting node and including no information identifying the intended receiving node.

10. The method of claim 9 further comprising the steps of
retaining a copy of said transmitted exclusionary trees,
receiving a hello message over a link,
determining in response to said hello message if a copy of an exclusionary tree previously transmitted over said link has been retained and, if so,
transmitting over said link a copy of said previously transmitted exclusionary tree and, if not,
constructing from the received exclusionary trees above recited a new exclusionary tree for said link and
transmitting said new exclusionary tree over said link.

11. The method of claim 9 wherein said hello message further includes information identifying the version number of the routing method used by the transmitting node.

12. The method of claim 11 further comprising the steps of
receiving a hello message,
comparing the version number of the routing method used by the node transmitting said hello message with the version number of the routing method used by the receiving node, and if equal,
transmitting an exclusionary tree over the link, and if different,
modifying the routing method used by the receiving node.

13. The method in claim 12 wherein said step of modifying comprises the step of
transmitting an exclusionary tree over the link in a modified format.

14. The method in claim 12 wherein said step of modifying comprises the step of
refraining from transmitting an exclusionary tree over the link.

15. The method of claim 6 further comprising the steps of:
retaining the received exclusionary trees,
detecting the occurrence of a link going down, and
discarding the retained exclusionary tree received over said link.

16. The method as set forth in claim 6 wherein said route table contains multiple routes for a given destination node.

17. The method as set forth in claim 16 wherein said multiple routes are indicated by multiple node numbers.

18. The method as set forth in claim 16 wherein said multiple routes are indicated by multiple link numbers.

19. The method as set forth in claim 18 wherein said network includes multiple links interconnecting two nodes.

20. The method as set forth in claim 19 wherein said multiple links are treated independently and carry identical exclusionary tree information.

21. The method as set forth in claim 6 wherein said exclusionary trees include weight information indicating relative delays encountered on said links.

22. The method as set forth in claim 6 wherein said exclusionary trees are minimum spanning trees.

* * * * *